United States Patent
Kassianoff

(10) Patent No.: US 10,060,409 B2
(45) Date of Patent: Aug. 28, 2018

(54) PULSED LOCOMOTOR

(71) Applicant: Edouard Kassianoff, Foothills (CA)

(72) Inventor: Edouard Kassianoff, Foothills (CA)

( * ) Notice: Subject to any disclaimer, the term of this patent is extended or adjusted under 35 U.S.C. 154(b) by 0 days.

(21) Appl. No.: 15/533,611

(22) PCT Filed: Jan. 12, 2015

(86) PCT No.: PCT/CA2015/050015
§ 371 (c)(1),
(2) Date: Jun. 6, 2017

(87) PCT Pub. No.: WO2015/196276
PCT Pub. Date: Dec. 30, 2015

(65) Prior Publication Data
US 2017/0370344 A1 Dec. 28, 2017

(30) Foreign Application Priority Data
Jun. 25, 2014 (WO) ................ PCT/CA2014/050605

(51) Int. Cl.
*F03B 17/06* (2006.01)
*B63H 1/32* (2006.01)
(Continued)

(52) U.S. Cl.
CPC ............ *F03B 17/06* (2013.01); *B60F 3/0007* (2013.01); *B63H 1/30* (2013.01); *B63H 1/32* (2013.01); *B63H 3/008* (2013.01); *B64C 11/325* (2013.01); *B64C 25/32* (2013.01); *B64C 29/0008* (2013.01); *F03B 13/14* (2013.01); *F03B 13/20* (2013.01); *F03D 5/06* (2013.01); *F05B 2210/16* (2013.01); *F05B 2220/90* (2013.01); *F05B 2240/311* (2013.01); *F05B 2240/931* (2013.01); *Y02E 10/28* (2013.01); *Y02E 10/38* (2013.01); *Y02E 10/70* (2013.01); *Y02T 70/5254* (2013.01)

(58) Field of Classification Search
CPC .......... F03B 17/06; F03B 13/14; F03B 13/20; B64C 25/32; B64C 11/325; B64C 29/0008; B60F 3/0007; F03D 5/06; B63H 1/32; B63H 3/008; B63H 1/30; F05B 2210/16; F05B 2240/311; F05B 2220/90; F05B 2240/931; Y02T 70/5254; Y02E 10/38; Y02E 10/28; Y02E 10/70
See application file for complete search history.

(56) References Cited

U.S. PATENT DOCUMENTS

| 6,371,821 B1 * | 4/2002 | McCarthy | A63B 31/11 441/64 |
| 7,578,898 B2 * | 8/2009 | Le Gal | B65H 18/10 156/184 |

\* cited by examiner

*Primary Examiner* — Michael C Zarroli

(57) ABSTRACT

A Pulsed Locomotor (120), for propelling media, fluids and crafts, in fluids and on land, comprising a blade (124) securely connected to a drive shaft (122). Upon reciprocation, the ambient medium is forced towards the trailing edge of the blade (124) thereby causing a reactive locomotion of the apparatus, substantially along the plane of the blade. Apparatus is secured to motor M by fastening through aperture (130). The apparatus can be operated directly by motor M, and indirectly by the reaction momentum imparted to a supporting platform P. Thrust is directed by steering handle (128) about a bearing (126), rotatably coupling to platform P and base C. Lubricant L is supplied to outlets (134) via conduit (136) and inlet (132), to coat the apparatus with a lubricant cavity, for drag reduction. The blade (124) planes along a figure 8 reciprocation path s1e1s2e2s1. Crafts are embodied.

18 Claims, 9 Drawing Sheets

(51) Int. Cl.
  B63H 1/30   (2006.01)
  F03B 13/20  (2006.01)
  F03D 5/06   (2006.01)
  B60F 3/00   (2006.01)
  B63H 3/00   (2006.01)
  B64C 11/32  (2006.01)
  B64C 25/32  (2006.01)
  B64C 29/00  (2006.01)
  F03B 13/14  (2006.01)

FIG. 2 - Static thrust and power use during reciprocation at 19 mm stroke length

FIG. 3 - Influence of blade width on thrust and reciprocation frequency

PULSED LOCOMOTOR

TECHNICAL FIELD

The present invention relates to propulsion systems and, more particularly, to devices that propel media, fluids and crafts in oscillation mode, in fluids and on land.

BACKGROUND ART

The propeller screw and its many modifications form the basis of most current fluid propulsion systems. Design and manufacture of the propeller screw requires mastery of foil dynamics in which profile, shape, area, angle, number of blades, and speed are important parameters. Moreover, the phenomena of cavitation and stall limit the performance of the majority of propeller screws. Propeller screws are also sometimes lethal to wildlife.

There is an effort to develop alternative propulsion systems in the form of reciprocating wings, with a promise of greater efficiency. Most engines in use today are of the reciprocating type, yet they are invariably used in rotary mode; the mechanical simplification afforded by direct drive of oscillating propulsion systems would be a major advantage. Reciprocating propulsion systems may also be better suited to harnessing wave power for propulsion, further increasing efficiency and helping to preserve the environment through reduced hydrocarbon use. Notwithstanding orientation, and based on mode of actuation, oscillating, planiform propulsion systems can be broadly summarized into rotative oscillation and translating oscillation. Rotative oscillation or fish tail type systems include systems wherein the fulcrum or center of rotation is located substantially at the leading edge of the blade and systems with the fulcrum located in an offset position, some distance down from the leading edge. Patents U.S. Pat. No. 4,214,547 to Hetland (1980), U.S. Pat. No. 4,894,032 to Sbrana (1990) illustrate rotative oscillation at the leading edge of the blade. Rotative oscillation from an offset fulcrum is illustrated for example in U.S. Pat. No. 6,250,585 to Pell (2001). Performance of these fish tail type propulsion systems is limited by the natural resonant frequency of materials used for construction, the thrust being reduced by the formation of standing waves at the resonant frequency; tuned compliant driveshafts have been described to overcome this limitation, at least up to 5 HZ, in U.S. Pat. No. 6,250,585 to Pell (2001).

Translating oscillation propulsion systems generally comprise a foil attached to a translating member; the foil is pivotally secured to the translating member so as to be positioned to the effective angle of attack by way of additional angling means. Angling means include movement range limiters and mechanical indexing linkage and positioning systems as illustrated, for example, in U.S. Pat. No. 4,102,293 to Geoffroy de la Roche (1978). U.S. Pat. No. 5,401,196 to Triantafyllou et al. (1995) and U.S. Pat. No. 4,371,347 to Jakobsen (1983). Current translating wing oscillation systems require many moving parts and are considered noisy and cumbersome. The complexity of the mechanisms required in current translating systems pose challenges to high speed operation. In addition, all current fluid propulsion systems act exclusively on fluids. Therefore it is an object and advantage of the Pulsed Locomotor to provide a simplified self adjusting propulsion system that can act on solid, liquid and gaseous media, without the need for angling devices in fluids.

The Pulsed Locomotor of the present disclosure can operate partially or fully submerged, and on land. The implement can be used as a fluid mixer and could be remotely actuated by electromagnetic fields much like a magnetic stir bar, propeller or the likes; it can also be used as a thruster in boating and swimming. The unique geometry and operation of the Pulsed Locomotor provide for cyclic acceleration and ejection of the ambient medium to produce thrust and enable displacement. In land based operation, the Pulsed Locomotor hops in discreet steps by leveraging or forcing against land or upon the ground.

It would be obvious to those skilled in the art that a reciprocation stroke length of 19 mm is employed in CA2854305, a parent application to the Pulsed Locomotor herein disclosed. Other objects and advantages of my invention will become apparent from the detailed description that follows and upon reference to the drawings.

BRIEF DESCRIPTION OF THE DRAWINGS

A complete understanding of the present invention may be obtained by reference to the accompanying drawings, when considered in conjunction with the subsequent, detailed description, in which.

DISCLOSURE OF INVENTION

Figure 1:
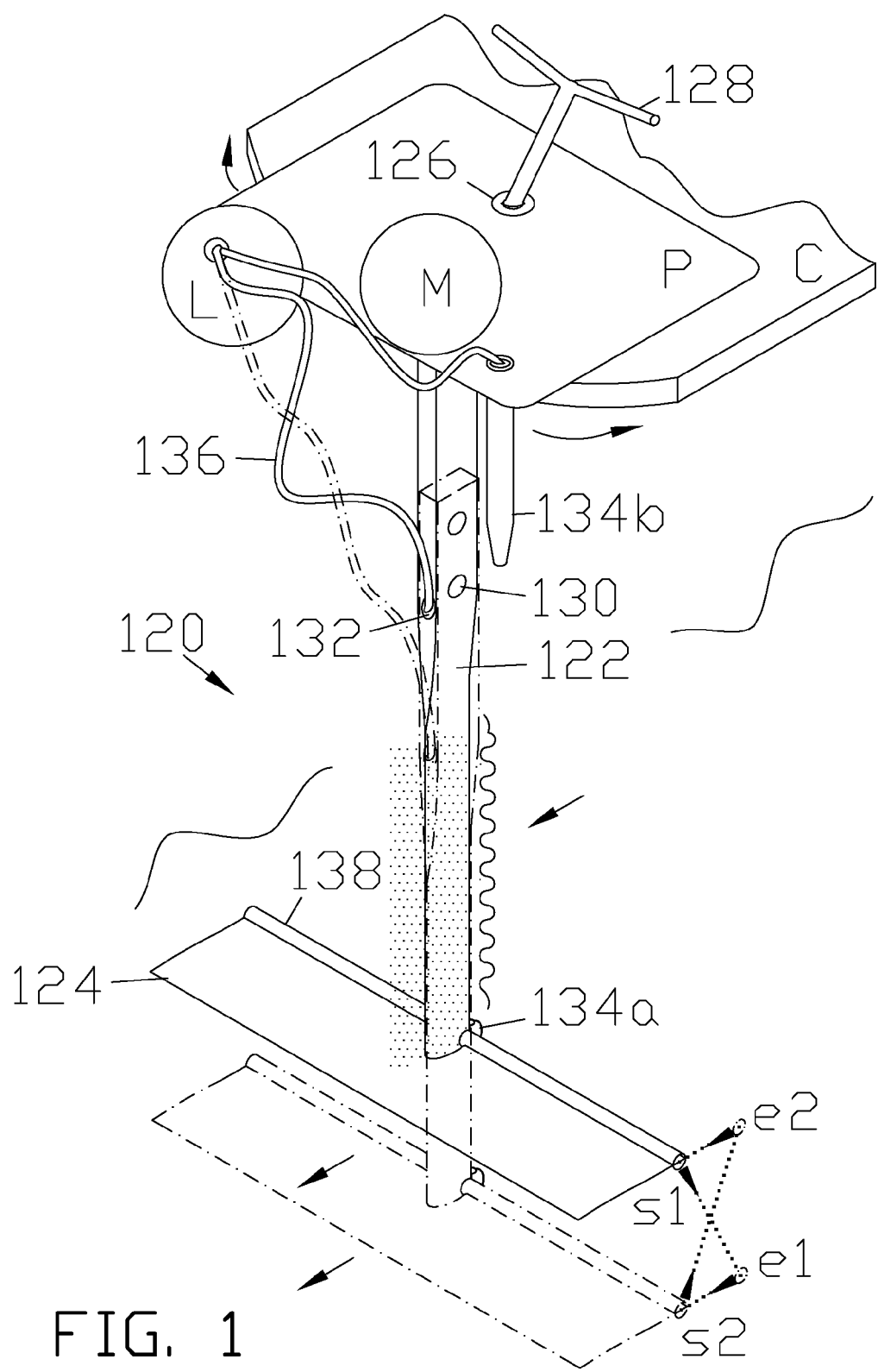
FIG. 1 is a perspective view of one embodiment of the Pulsed Locomotor showing a normal attachment of the driveshaft to the blade and lubricant cavity provision.

The Pulsed Locomotor can propel ambient fluids upon pulsation, reciprocation or oscillation by a motive power source. The apparatus can serve the dual purpose of wing and propeller, propelling a craft while supporting it in ambient fluids. The device can be made by attaching a handle or driveshaft to the leading end of a blade. The leading end of the blade leads the device in the direction of travel and has a leading edge; conversely the opposite end is the trailing end, with its trailing edge. In a similar way, the driveshaft, shaped for minimum drag in ambient fluids, has a leading edge and a trailing edge. The blade and the driveshaft can be made out of polymer, composite, wood, metals or any other materials that are durable under contemplated dynamic loads; the blade and the driveshaft are advantageously made out of low drag materials and profile. The trailing edge of the blade and the driveshaft is either thin or advantageously tapered to a fine edge in order to shed ambient fluids with minimum resistance; the leading edge is advantageously radiussed to accelerate and promote flow onto the blade and the driveshaft. A wide variety of blade morphology can be used: rectangular, square, triangular, lozenge, trapezoidal and naturally occurring fin and wing shapes as are obvious in swimming and flying creatures and machines. In some embodiments, the driveshaft is securely connected to the blade substantially at right angle to the blade's surface or in a normal configuration; in other embodiments, the driveshaft is attached alongside, in a coplanar configuration to the blade surface. The normal attachment is best suited for heaving, up and down or vertical reciprocation by a motive power source while the coplanar attachment is best reciprocated from side to side. Reciprocation is in a plane normal to the surface of the blade. However, the mode of reciprocation is not limited by the modes of attachment.

Coplanar attachment of the driveshaft offers the advantage of reinforcement of the leading end of the blade. When used in vertical orientation relative to the surface of a water body for example, and in side to side reciprocation, this embodiment has the advantage of minimum drag; drag of the driveshaft is minimized since the driveshaft is integrated into the leading edge of the Pulsed Locomotor. When installed on a watercraft, the depth of immersion of the assembly can be varied to suit operating conditions. For example, as the craft picks up speed and lifts off the water, the implement remains partly in contact with the water, part of it being out of water, in the air. This works out well for efficiency as the craft being airborne requires less propulsive force in the water; the reduction in immersed propeller surface area results in a reduction of drag, enabling faster oscillation rates. The swaying motion of the craft, in reaction to implement reciprocation, also reinforces and provides further actuation of implements attached to the craft.

Normal attachment of the driveshaft: Reactive motion of the craft becomes primarily heaving up and down, affording better steering control. Also the heaving motion of the craft reinforces and provides further actuation of implements attached to the craft. However the driveshaft also brings additional drag; this drag can be mitigated by the use of lubricant cavity provision means that coat the driveshaft with a fast moving fluid or with a fluid of a density lower than that of the ambient fluid.

Depending on intended context of use, the leading end of the blade may be reinforced to prevent collapse or folding under fluid dynamic load: methods used for making toy paper aircrafts can be applied to fashion the reinforcement. Thus, reinforcement can be provided by folding or rolling of the blade over itself to provide either a cylindrical head blade or a V-shaped blade with a V-head. The V-blade embodiment herein includes similar shapes like the U-shape or other similar shapes. The cylindrical head term herein includes profile modifications for reduced drag such as ellipsoid, oval, and foil shapes, for examples. The driveshaft is secured to the head of the blade by welding, molding, gluing, compositing, rivets, fasteners or any other means suitable for the materials at hand. The driveshaft is advantageously made out of strong but light weight materials: polymers, composites, wood, metals for examples. Similar materials can be used to provide bracing of the blade to the driveshaft, for additional reinforcement. Such bracing can join the driveshaft to the sides of the blade, intermediate positions, or any other position as determined from engineering requirements for the intended application context. Any bracing or adaptation of the driveshaft for fitness of function is herein considered to be a part of the driveshaft and is therefore regarded as such. Any other materials suitable to the context of use can be utilized to make the driveshaft. Where a larger blade is used or where multiple motors or reciprocating mechanisms are employed to drive the same blade, a plurality of driveshafts may be provided to adequately support the blade and its operation. Alternatively, the driveshaft can be integrated with the blade by molding, forming, forging, welding or casting as a single unit. Coring of the blade and the driveshaft with buoyant materials can be used to reduce the reciprocation load in ambient fluids: polymer foams such as expanded polystyrene and polyurethane are examples of coring that can be used for liquid fluids like water; hydrogen and helium are examples of coring that can be used for gaseous fluids such as air.

The driveshaft may also be provided advantageously as a hollow tube, for conveyance of a low density or fast moving fluid to the leading surface of the driveshaft whereby drag in the ambient fluids can be reduced or managed by providing a lubricant cavity over the surfaces. Similarly, drag reduction using a lubricant cavity may be provided to the leading edge of the blade, the head and other associated fittings.

Upon reciprocation, planing of the blade ejects fluid from the trailing edge of the blade, forcing the implement in a direction opposite that of fluid ejection; the Pulsed Locomotor can thus be cyclically urged forward during each stroke and cyclically relaxed rearwards between the strokes. These cyclic displacements magnify with stroke frequency to create figure-8 and intermediates, variable reciprocation paths. The magnitude of the thrust thus created is proportional to the size of the implement and the reciprocation or stroke frequency. For a flexible blade, fluid ejection from the trailing edge of the blade is further promoted by dynamic blade cambering and the inclined travel path of the blade during reciprocation, individually or in combination. Thus, a stiff or rigid blade attached to the driveshaft can produce thrust due to planing along the inclined reciprocation paths created or caused by the cyclic forward urging and rearwards relaxation of the implement. A flexible blade cambers under fluid dynamic load and thus further enhances fluid acceleration and reduce drag of the implement in the ambient medium.

Materials and methods for fabrication of metals, polymers and composites products are known to those skilled in the art and can be applied to the manufacture of the apparatus. Examples of criteria for suitable materials include fatigue and corrosion resistance, durability, ease of fabrication and other characteristics pertinent to the fluid and context of use. The apparatus may also be made by any of or a combination of stamping, rolling, extrusion, moulding, casting, forging or machining of wood, metals, sheeting, or polymers. Any other suitable fabrication method can be used. Joining can be done by welding, gluing, or other fastening methods, for example, rivets. However, a streamlined fluid dynamic profile, hydrodynamic or aerodynamic, is advantageous for low drag. Materials as well as joining materials and methods suitable for high vibration equipment are known to one skilled in the art and are hereby recommended, depending off course on the specific application parameters.

Neutral or positive buoyancy of the apparatus in ambient fluids can be used to eliminate or manage the mechanical and gravitational loads associated with the mass of the apparatus during oscillation; this can be achieved by attaching buoyant materials directly to the implement or by cored construction enclosing a medium whose density is lower than that of the ambient fluid; helium or hydrogen could be used for operation in a gaseous atmosphere for example. Expanded polymer foams such as polystyrene and polyurethane are examples of coring that can be used to achieve a desired buoyancy level in liquid fluids such as water. When not in use, a water based buoyant Pulsed Locomotor of long stroke could automatically float to the shortest distance from its craft, at the top of stroke position; this would lessen the risk of damage by collision with obstacles in the water.

The geometry dynamics disclosed provide conversion of fluid power into thrust, within the rules of fluid dynamics pertinent to each context. It would be obvious to one skilled in the art to provide a variety of geometrical shapes without departing significantly from the scope of the present invention. While I believe the implement operates in the manner described above and as will be described further on I do not wish to be bound by this.

The apparatus can be held and actuated by hand motion or secured in a guide for actuation; the rocking and rolling motion of a craft to which it is attached may also actuate it.

MODES FOR CARRYING OUT THE INVENTION

For purposes of clarity and brevity, features whose function is the same or basically the same will be identified in each FIG. or embodiment by a prefix of the FIG. number the variant feature appears in, followed by the feature number, the feature number being the same for all variants.

Figure 2:
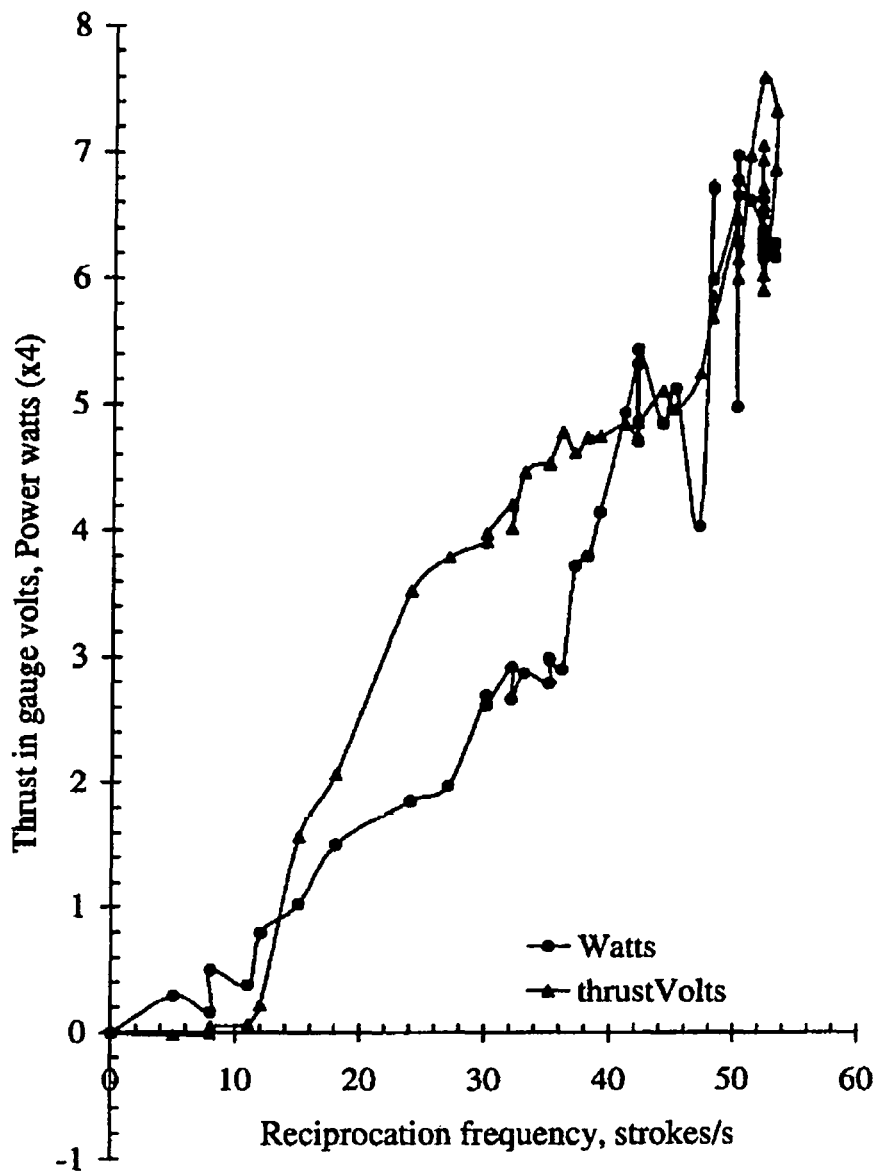
FIG. 2 is a chart view of thrust output and power usage for a Pulsed Locomotor of 0.30 m span and 0.03 m width, reciprocated in water.
Figure 3:
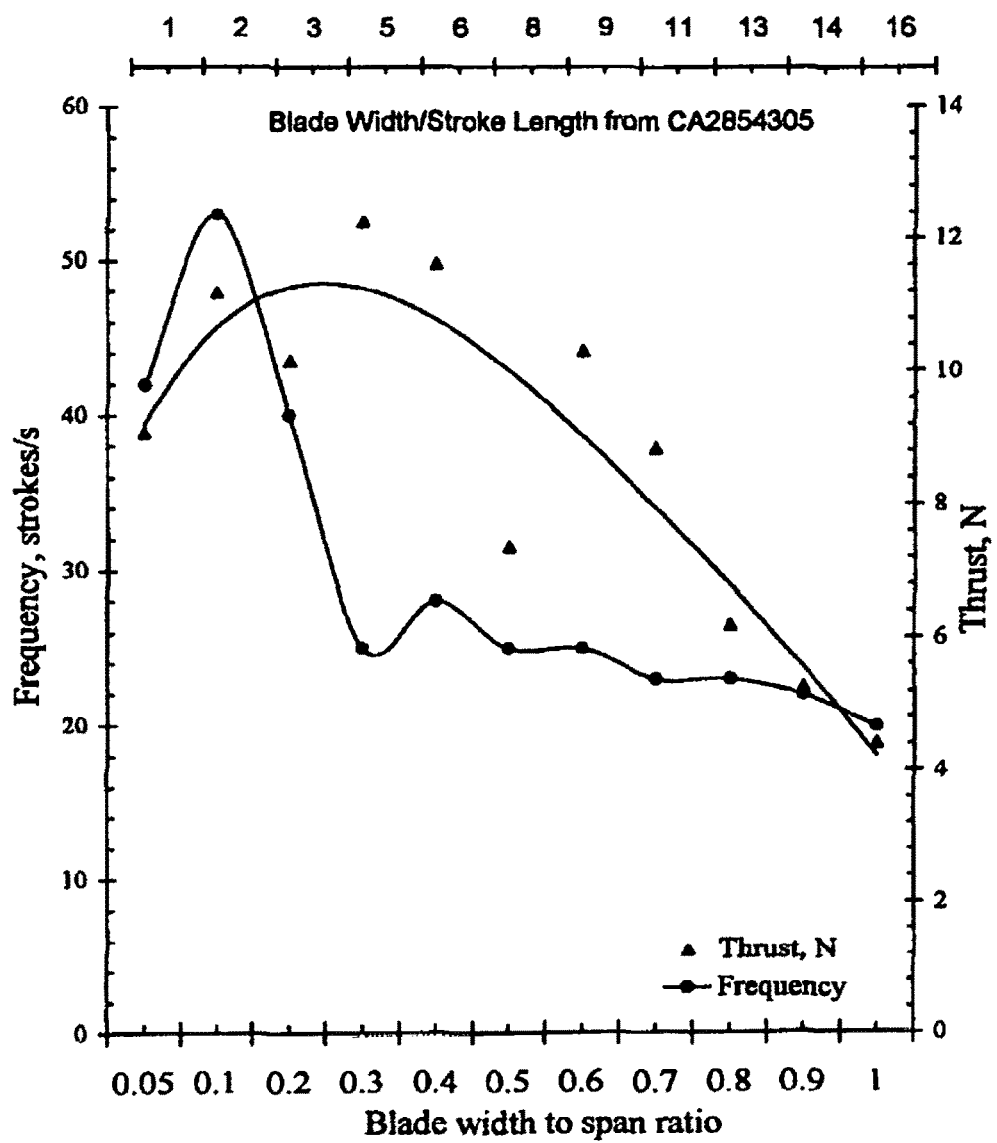
FIG. 3 is a chart view of the influence of blade width on thrust and reciprocation frequency.

Basic Blade Embodiments and Operation—FIGS. 1-3

A Pulsed Locomotor 120 is shown in FIG. 1 with a driveshaft 122 normally attached to a blade 124. The driveshaft 122 is secured preferably substantially to the middle of the blade 124, along the leading edge. The driveshaft 122 may be coupled to a reciprocating device or motor M, secured to a platform P; the platform P is rotatably secured to a base or craft C, here in truncated form, via bearing 126. Steering or vectoring of propulsion can be achieved by turning a control handle or steering handle 128, secured to the platform P, about the bearing 126, as shown by curved arrows. The driveshaft 122 may be coupled to motor M directly or by fastening through aperture 130 using fasteners, bolts and nuts for, example. Any other safe coupling method can be used.

Figure 8:
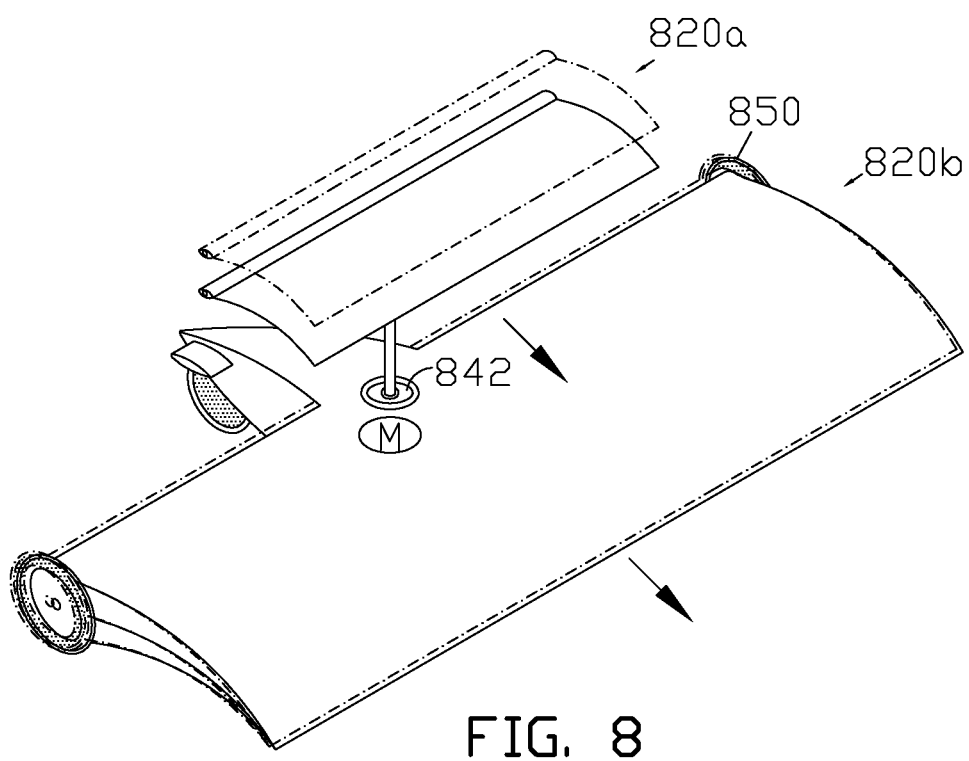
FIG. 8 is a perspective view of an aircraft embodiment powered by the action of one Pulsed Locomotor and the reaction imparted to a second, supporting Pulsed Locomotor.

Upon translating reciprocation, ambient fluids are ejected from the trailing edge of the blade 124, as depicted by the two bottom arrows, forcing the Pulsed Locomotor 120 in a direction opposite that of fluid ejection. Figure-8 and intermediates reciprocation paths develop, as depicted in FIG. 1 by the path s1 to e1 to s2 to e2 to s1. Starting from rest position s1 the down stroke urges the implement forward to stroke end position e1, along the inclined path s1-e1, by reaction to propulsion of fluid rearwards. From the end of stroke position e1, the implement relaxes back to upward stroke start position s2, along path e1-s2; the upward stroke urges the implement forward to stroke end position e2, along path s2-e2; from position e2 the implement relaxes back to the original start position s1, along path e2-s1; the process continues as long as the Pulsed Locomotor 120 is reciprocated.

Thus, upon reciprocation, the ambient medium or fluid is forced towards the trailing edge of the blade thereby causing a reactive displacement of the apparatus, substantially along the plane of the blade. The Pulsed Locomotor 120 is thus cyclically urged forward during each stroke and cyclically relaxed rearwards between the strokes. In this way, a stiff or rigid blade 124 attached to the driveshaft 122 can produce thrust by planing along the inclined reciprocation paths created by the cyclic forwards urging and rearwards relaxation of the implement A flexible blade 124 cambers under fluid dynamic load and thus further enhances fluid acceleration or thrust and reduces drag of the implement in the ambient fluids. The blade 124 may also be welded to the driveshaft 122 at an effective fluid dynamic angle to provide a propulsive hydrofoil or airfoil. Alternatively, the implement may be angled by way of an attached gimbal mechanism, as is described further on. FIGS. 2 and 3 exemplify the influence of implement dimensions on reciprocation frequency, static thrust and power consumption for a Pulsed Locomotor 30 cm in span with a vinyl blade 0.075 cm thick, reciprocated with a crank mechanism powered by a 54 W D.C. electric motor. Power consumption increased with thrust output, showing large variations as the reciprocation frequency was increased (FIG. 2).

Both thrust and reciprocation frequency generally declined with increase in the width of the blade (FIG. 3). Maximum reciprocation frequency exceeded the no load maximum stroke rate of 45 strokes/s for the driving motor with reciprocating mechanism, peaking between 1 and 3 ratio of blade width to the stroke length of 19 mm described in parent application CA2854305.

Embodiment with lubricant cavity for drag reduction—FIG. 1

It is anticipated that, as long as implement size and stroke length exceed cavitation bubble size, the Pulsed Locomotor continue to function under cavitation conditions. Cavitation bubbles formed during reciprocation may contribute to thrust by being ejected together with the ambient medium as the lower density bubbles escape. For crafts in a gaseous fluids, the reciprocation may mitigate detachment of the boundary layer from the surface of the implement by waving through the ambient gases instead of staying stalled within the turbulence, as current wings do. One consequence of this effect is the feasibility of operation at much higher speeds and altitude that are marginal for current screw propellers. Cavitation over the Pulsed Locomotor can occur at high oscillation frequency and travel velocity, which reduces drag of the implement. Alternatively, a lower density fluid or fast moving fluid may be coated over the Pulsed Locomotor surfaces to reduce drag. The lubricant cavity provision means may be integrated with the Pulsed Locomotor 120 or be installed independent of the Pulsed Locomotor 120, for example on the platform P. FIG. 1 shows a Pulsed Locomotor 120 fitted with the driveshaft 122 fluidly connected to a lubricant inlet 132 and a lubricant outlet 134a via a lubricant conduit 136. A pressurized fluid such as air or water is conveyed from a source L secured to platform P, to lubricant outlet 134a through lubricant inlet 132 and driveshaft 122, by way of lubricant conduit 136. For this purpose, the driveshaft 122 is preferably a tubular, scaled conduit. The pressurized fluid exits the lubricant outlet 134a, as illustrated by the wavy line, to coat the leading surface of the driveshaft 122 and thus lubricate movement of the apparatus in ambient fluids. As the implement travels, the rush of oncoming fluids, shown by the middle arrow, coats the lubricant over the surface of the driveshaft 122, as depicted by dots. Whilst the lubricant outlet 134a is shown at the bottom of the driveshaft 122 in FIG. 1, it may advantageously be installed instead near the top of the driveshaft 122, to blast a jet of air, for example, downward along or slightly ahead of the leading edge of the driveshaft 122. For example, a nozzle blasting compressed air, along or slightly ahead of the leading edge of the driveshaft 122, can be used to coat the driveshaft 122 with an envelope of air. In this top position, the blast of air can assist with lessening the reciprocation load on the upward stroke. Supply of pressurized fluid to the lubricant inlet 132 has to allow for the reciprocating movement of the Pulsed Locomotor 120, as shown by the extended lubricant conduit 136, in phantom lines; this can be achieved, for example, by way of a flexible hose, bellows, moveable seals, or static seals embracing to the driveshaft 122. Alternatively the lubricant outlet 134b may be fixed on the platform P, fore of the implement, for example, to blast a jet of air into the ambient fluids.

Promotion of formation of lubricant cavity: the surface of the Pulsed Locomotor 120 may be configured or constructed to promote natural formation of a reduced viscosity boundary layer of the ambient fluids as provided, for example, by cavitation phenomena in water; examples of such surface construction include sandblasting, dimpling and microstructures that reduce surface friction with ambient fluids such as is used on golf balls, for an example. Mechanical vibrations from the motive power source and reciprocating mechanisms can also promote cavitation on the Pulsed Locomotor 120 and the supporting craft or base C, thereby reducing drag.

As the implement travels through the ambient fluids, the speed of the oncoming fluids adds to the speed of fluid ejection, further enhancing thrust. A plurality of Pulsed Locomotors can be arranged in a cascade or tandem arrangement to feed fluid ejections from one to the intake of another, thereby providing enhanced feedback propulsion. The tandem arrangement may share a common driveshaft 122.

Embodiments with a Head—FIGS. 1, 4-7

As shown in FIG. 1, a head 138 of cylindrical shape, a cylindrical head, may be securely attached to the leading edge of the blade 124. This can be done by directly joining the head 138 to the blade 124 by welding, gluing or other joining method suitable for the materials at hand; a slot may be cut lengthwise in the cylindrical head 138; the blade 124 is slid through the slot into the cylindrical head 138 for welding, epoxying, gluing or for interference capture. Alternatively, the leading end of the blade 124 can be rolled into a cylinder to provide the cylindrical head 138. The rolled leading end of the blade 124 can also inserted into the lumen of the cylindrical head, with the blade 124 protruding through the slot. The assembly can be made rigid by interference fitting or by welding, gluing, epoxying in place or by any other suitable method. This embodiment provides the option of convenient blade 124 replacement; alternatively, the blade 124 can simply be welded permanently to the head 138 and the driveshaft 122. The cylindrical head embodiment can also be built by securing the blade 124 to a solid or tubular cylindrical member to which the driveshaft 122 is then attached. The cylindrical head functions as a first stage fluid accelerator to the fin provided by the trailing end of the blade 124.

Figure 4:
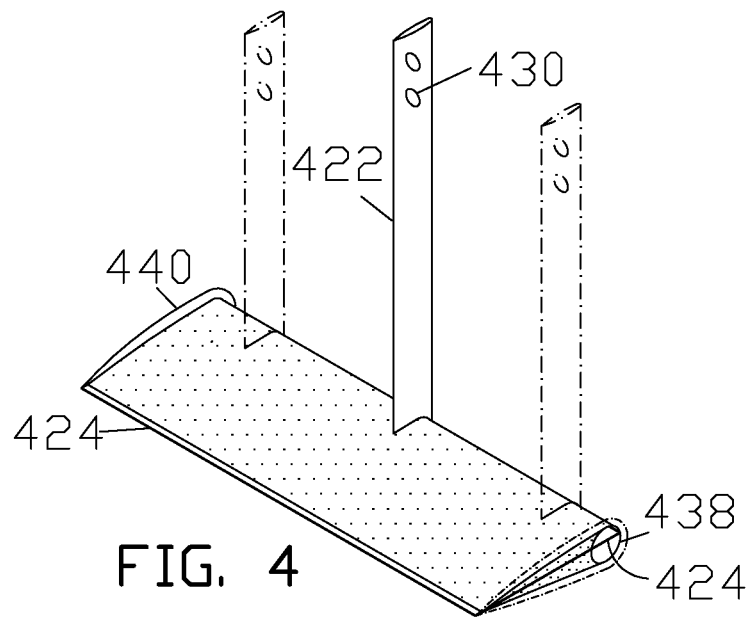
FIG. 4 is a perspective view of an embodiment of the Pulsed Locomotor showing side edge fences, blending of surfaces and alternative location of the driveshaft.

As shown in FIG. 4, the head may be filled with a buoyant core to reduce the reciprocation load in ambient fluids. The junctions between the head 438 and the blade 424 can be filled with similar material to smoothly blend the surfaces or fillet the radius of the head 438 into the blade 424. The surface blending effectively creates a wing structure securely connected to the driveshaft 422. Thus, a wing structure attached to the driveshaft 422 and operated as herein disclosed, is considered to be the equivalent of the blade 24, and is hereby explicitly claimed as the Pulsed Locomotor. The junction between the driveshaft 422 and the blade 424 can be blended in a similar manner to reduce drag in ambient fluids. FIG. 4 also shows a side edge fence 440 fitted to the left side of the wing; the opposite side edge fence 440 is shown in broken lines on the right side. The side edge fence 440 funnels fluid flow over the blade 424 or the wing resulting from surface blending. The side edge fence 440 also provides some degree of lateral stability during reciprocation and travel of the implement. The side edge fence 440 is advantageously made out of streamlined, thin and strong sheeting to minimize drag in ambient fluids. Other materials and shapes may be utilized depending on the context of use.

Figure 5:
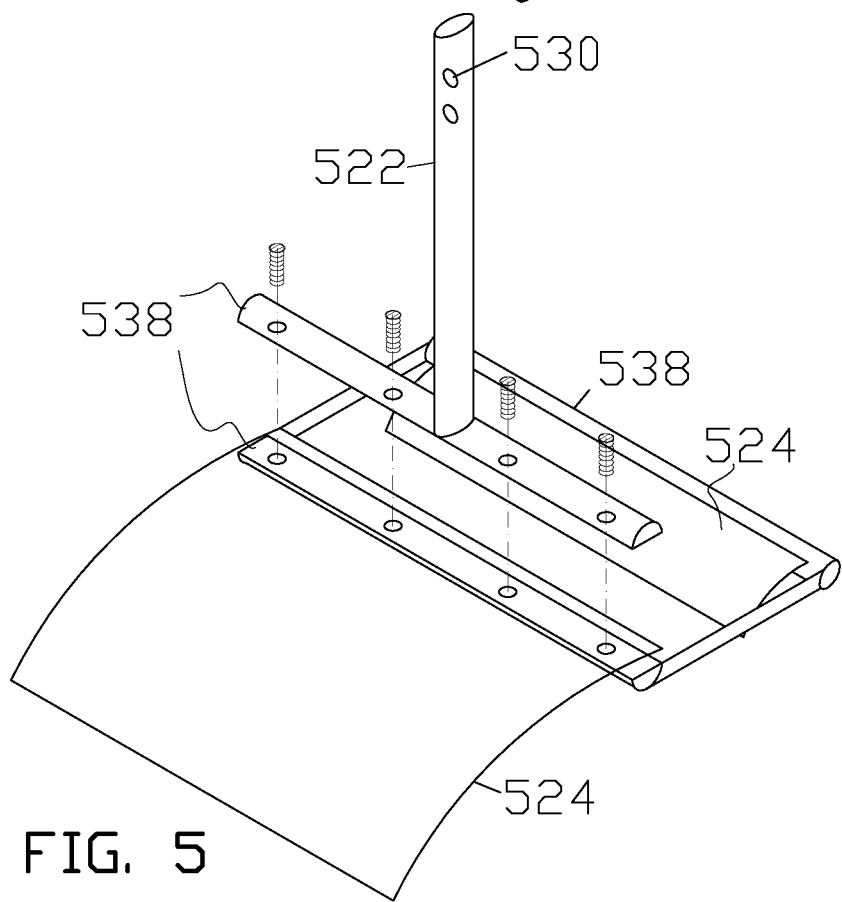
FIG. 5 is an exploded view of one method of attaching the blade to a driveshaft with a view of a multistage tandem embodiment of the Pulsed Locomotor.

The side edge fence 440 may be reduced in half and shaped to have a curvature for directing fluid flow to one side of the blade 424 along the side edges, at right angle to the plane of the blade 424. For example, with a downward facing side edge flow director, ambient fluids are directed and accelerated downward during the upward stroke, due to the curved surface of the side edge flow director. Acceleration of fluids downwards reduces the reciprocation load. On the downward stroke, ambient fluids are funneled over the blade 424 towards the trailing edge. A longitudinal portion of a cylinder may be used as a side edge flow director. The angle of fluid direction may be varied to suit operating requirements such as stability during reciprocation and travel. Alternative attachment of multiple driveshafts 422 to the head 438, or the blade 424, is also shown in FIG. 4, in phantom lines. FIG. 5 shows details of another method of construction of the implement, using a T-shaped driveshaft 522, having a head 538 and a strut. The strut is the reciprocation handle, for coupling to the motive power source, for example by bolting through aperture 530, as previously described. The blade 524 is sandwiched between paired half cylinders, together forming the head 538, drilled with holes for fastening; fasteners, exemplified here as four screws or bolts, are used to assemble the blade 524 and the paired half cylinders, along the projection lines. A plurality of Pulsed Locomotors can be arranged in a cascade or tandem arrangement to feed fluid ejections from one to the intake of another, thereby providing enhanced feedback propulsion, as exemplified in FIG. 5.

A variant of the above embodiment can be provided with a substantially V-shaped head similar to caudal fins of fast swimming marine creatures, in Tuna fish, for example. The V-shaped head embodiment provides a reduced drag form and so is particularly advantageous on crafts traveling at high speed. The V-shaped head can be built any other way.

Figure 6:
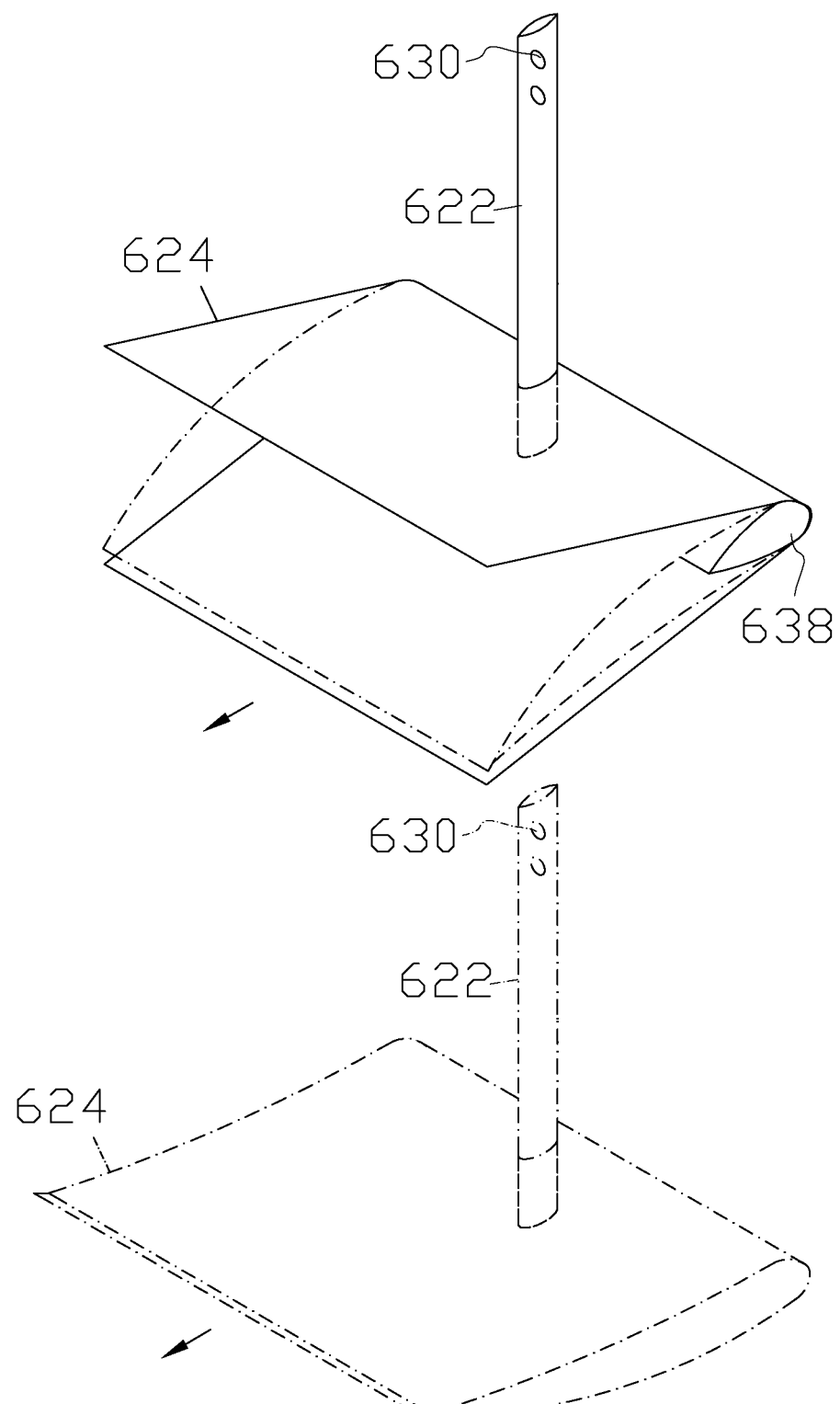
FIG. 6 is a perspective view of a V-shaped embodiment of the Pulsed Locomotor with normal attachment of the driveshaft to a transparent blade.

V-Blade Embodiment and Operation—FIG. 6

The blade 624 is folded over itself into a V-shape as shown in FIG. 6 with an upper and lower fin or V-arms. The driveshaft 622 is secured to the leading end of the V-blade, advantageously substantially to the center of pressure associated with the wing profile the V-blade can morph into during operation. For a normal attachment, the driveshaft 622 is secured to and through the upper fin and to the lower fin. Alternatively, the driveshaft 622 can be secured to the head 638 over which the V-blade has been draped. For a coplanar attachment, the head 638, in extended form, assumes the function of the driveshaft 622. A convenient construction involves draping a V-blade to each arm of the head 638 on either side of the driveshaft 622, in a coplanar configuration; in this embodiment, the driveshaft 622 can also be regarded as being T-shaped. At low stroke frequency and travel speed, the V-arms of the V-blade function as separate fins, thrusting rearwardly the ambient fluids pre-accelerated by the radiussed head 638 of the V-blade.

Cambering of the V-arms under fluid dynamic load also promote acceleration of ambient fluids. As stroke rate increases the V-arms are drawn to each other, starting from their trailing edges and progressing towards the leading edge, as depicted in phantom lines. The upward stroke configuration of the V-blade is shown at the top, in phantom lines and similarly at the bottom, for the downward stroke. Depending on pattern of movement of the ambient fluids, the trailing edges first meet, creating a wing profile of maximum thickness; as the stroke rate is increased further the thickness of the wing decreases progressively towards the leading edge. Increase in travel speed of the apparatus in the ambient fluids further enhances the morphing of the V-blade into a variable wing. This embodiment provides a propeller with dual propulsion fins at low speed and a streamlined, speed adapting wing profile at higher speeds. Divergence of the V-arms influences the speed and stroke rate at which the V-arms are drawn to each other to form a wing profile. Thus, control of V-arms divergence provides a design tool for speed-dependent wing morphing.

INDUSTRIAL APPLICABILITY

Fluid pumps, crafts—watercrafts, waircrafts, aircrafts, landcrafts, All Media Vehicles A general application of the Pulsed Locomotor is in displacement of fluids, be it in enclosed casings as used for pumps or in the open as used for mixing, aeration of fluids, and ventilation, for examples. Attached to a craft, the apparatus can provide propulsion means for the craft's displacement in and about fluids, travel or transportation, by wave power or motive power on board. The implement's driveshaft can be guided by a sliding mechanism, an engaging channel or a roller guide for ease of operation. Movement of the driveshaft can also be guided by an embracing sleeve, bushing, rocker levers or roller assembly secured to a supporting base or craft: a square embrace can be used to fix thrust orientation whereas a round or rotatable embrace can be used to control thrust direction, for steering and maneuvering, for examples. Alternative means for steering and vectoring thrust from the Pulsed Locomotor include gimbal mechanisms and universal joints. Reciprocation can be provided directly by a reciprocating motive power source, such as muscle, an engine or motor, or via motion converter mechanisms, such as the scotch Yoke or crank arm mechanisms, for example.

Figure 7:
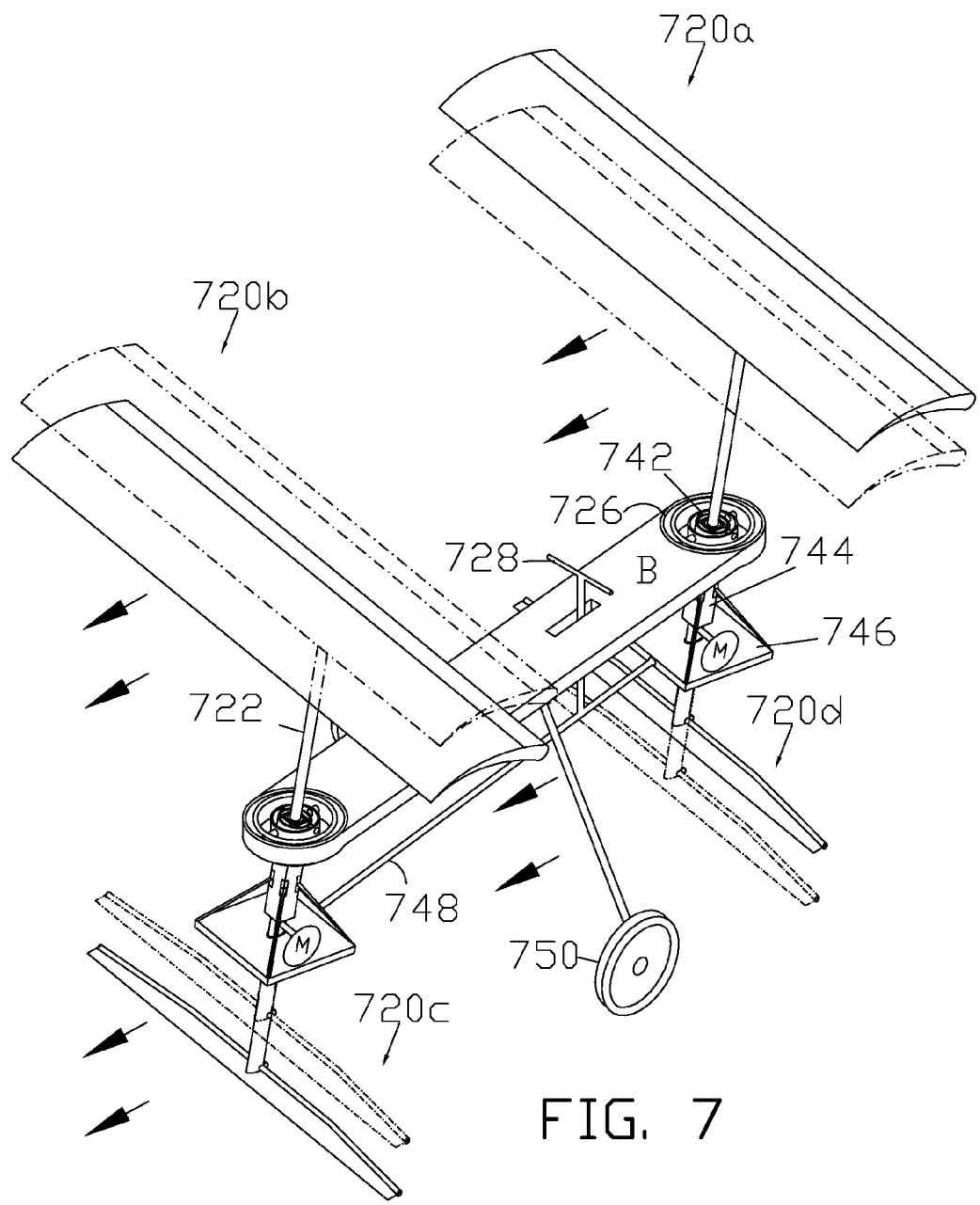
FIG. 7 is a perspective view of an All Media Vehicle (AMV) embodiment powered by the Pulsed Locomotor.

FIG. 7 illustrates an embodiment of an All Media Vehicle (AMV) powered by the Pulsed Locomotor 720 reciprocated by motor M. This hybrid water and air craft may be constructed by securing to a base B, an attitude control or steering device, here exemplified by a gimbal mechanism 742, rotatively secured to the base B via a bearing 726. Motor M and driveshaft guide 744 are secured together or to a gimbal plate 746; the driveshaft guide 744 is securely connected to the inner, moveable part of the gimbal mechanism 742. The driveshaft 722 is slideably secured to the driveshaft guide 744 and securely coupled to motor M, for reciprocating animation. Pulsed Locomotors 720a, 720b for gas or air propulsion share the driveshaft 722 with Pulsed Locomotors 720c, 720d, for liquid or water propulsion and locomotion over land. A steering handle 728 is cooperatively secured to a gimbal linkage 748. The gimbal linkage 748 is securely hinged to the gimbal plate 746, for example by means of ball joints. This connection indexes the gimbal mechanism 742 to movement of the steering handle 728: moving the steering handle 728 forward and backward angles the Pulsed Locomotors 720a, 720b and 720c, 720d forward and backward, respectively. Because the gimbal mechanisms 742 are rotatably secured to the base B, turning the steering handle 728 left and right turns the Pulsed Locomotors 720a, 720d to the left and 720b, 720c to the right or in opposite directions, thereby enabling steering. Orientation of the gimbal mechanisms 742 is controlled by turning the steering handle 728 much like handlebars in a bicycle, at least for the front end of the machine. Alternatively, the motor M may be installed on the base B and the Pulsed Locomotors reciprocated via a universal joint that allows angling and turning of the gimbal mechanisms 742.

This embodiment provides the advantage of feedback propulsion enhancement through the cascade of thrust from Pulsed Locomotor 720a to 720b for air propulsion and from Pulsed Locomotor 720d to 720c for water propulsion. Reciprocation of Pulsed Locomotors 720c, 720d also enable land based displacement or locomotion by hoping or stepping cyclically against land, the ground, mud, snow, ice or other media. For land based operation, the steering handle 728 is pulled backwards or forwards to angle the step of the Pulsed Locomotors 720c, 720d against the terrain for travel backwards or forwards, respectively. The Pulsed Locomotors could be made as long as is necessary to properly support and balance the craft on the ground, in water and in air, depending off course on size, weight and performance parameters contemplated. Alternatively at least one wheel 750 or preferably a pair of wheels can be securely connected to the base B to further balance and ease movement.

Where suitable, components can be made out of buoyant materials as previously discussed, to help float the craft in liquids or liquidized substances, for example in water, mud or bog. Whilst two separate motors are shown in FIG. 7 a single motor may be coupled to the front and rear Pulsed Locomotors via a crank mechanism, animating the front and back Pulsed Locomotors at 180 degrees phase, for example: this arrangement facilitates the walking of the machine as the strides go in step, akin to a human walk. Any other phase may be used depending on the design parameters. A secure harness or seating for the operator, attached to the craft, would be required (not shown). The base B may be provided in the form of a Pulsed Locomotor, for actuation by reactive momentum, as described further for FIG. 8. The embodiment can be fitted with a streamlined body or embellishments without necessarily departing from the spirit of the present invention. FIG. 8 shows an aircraft with a body in the form of Pulsed Locomotor 820b fitted with rolling devices in the form of carriage wheels 850, for landing and take off. Flight control surfaces, exemplified here by canard wings are fitted to the body. Pulsed Locomotor 820a is reciprocated by motor M; motor M is securely connected to Pulsed Locomotor 820b or base, and reciprocates Pulsed Locomotor 820a via a gimbal mechanism 842, as previously described for FIG. 7. Upon reciprocation, indicated in phantom lines, Pulsed Locomotor 820a thrusts the craft forward and build up speed to enable flight of the craft. Pulsed Locomotor 820b is reciprocated by reactive momentum to the reciprocation of Pulsed Locomotor 820a by motor M, as indicated in phantom lines. Control of flight can be effected through the gimbal mechanism 842, as previously discussed for FIG. 7 and by movement of the canard wings.

Figure 9:
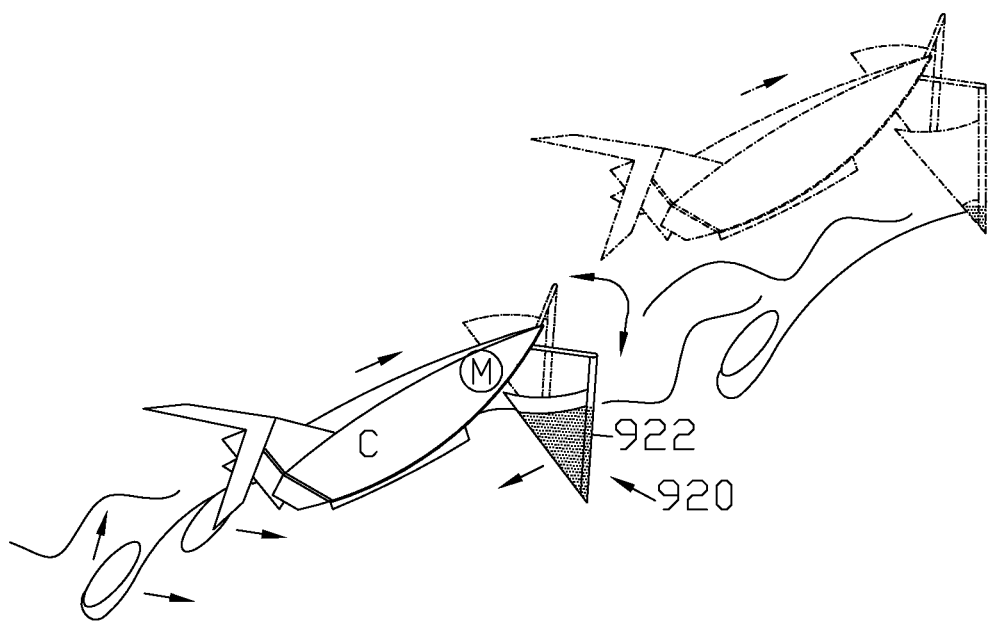
FIG. 9 is a perspective view of an aircraft-in-water, or "waircraft" powered by side to side reciprocation of a Pulsed Locomotor.

FIG. 9 shows a Pulsed Locomotor 920, exemplified in triangular shape, fitted to an aerodynamic craft C for a cranked, swiveling, side to side reciprocation by motor M, along the arcuate travel path indicated by the arrowed bow. Fluid ejection, in direction shown by bottom left arrow, imparts a reaction propulsive momentum to the craft C, displacing it in the opposite direction, shown by top arrows. At low speed the craft is water bound, with the Pulsed Locomotor 920 mostly or completely submerged in the ambient medium. As the craft C picks up speed, the aerodynamic surfaces lift the aircraft in water, or waircraft, to fly above the ambient fluids, as illustrated in phantom lines. The triangular Pulsed Locomotor 920 provides the advantage of high surface area and high thrust at low speed, and reduced surface area and drag at high speed of travel, as illustrated by shaded areas.

The waircraft offers the advantages of operation on water as a boat and in air as an aircraft, powered by water propulsion. The waircraft can be designed to fly above rough seas by control of altitude afforded by the variable length of the immersed portion of the driveshaft 922. Reduction of drag, by flying Wing-in-ground, results in improved fuel economy and speed of travel. In this embodiment there is also an additional centrifugal acceleration component caused by the arcuate swivel path of the implement: installation of the implement at the rear of the craft, in a trailing, rudder-like configuration, harvests this additional thrust. However, the front install, shown in FIG. 9, has the advantage of harnessing some of the thrust created by the side-swiping of the implement, shown by three oblique arrows to the left; fluid in front of the craft is set in motion ahead of the craft reaching it; the craft C does not have to confront still water. Whereas, for illustration purposes, the embodiment has been described with reference to water, the application extends to all fluids and media of various densities. During operation the apparatus also works as an energy harvester, like propellers do, by converting the energy in fluid flow into mechanical work.

Figure 10:
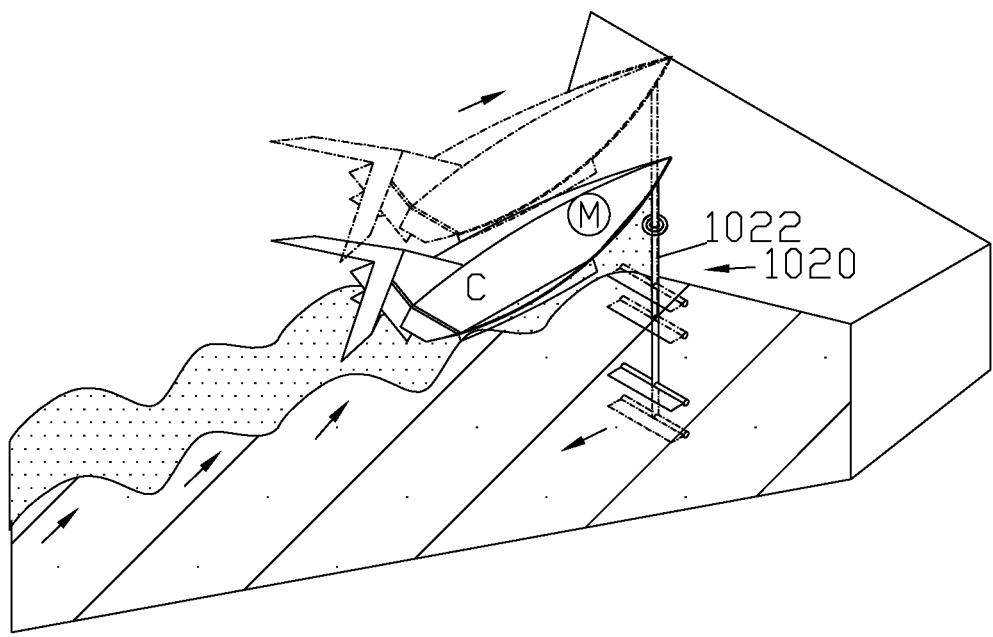
FIG. 10 is a perspective view of an imaginary section through a body of water, showing a waircraft powered by up down, heaving reciprocation of a Pulsed Locomotor.

FIG. 10 shows an example of a waircraft propelled by heaving of the Pulsed Locomotor 1020, driven by motor M on craft C. Pulsed Locomotor 1020 reciprocates up and down, accelerating and ejecting ambient fluids rearwards of the watercraft, creating waves of water moving away from the craft or abwaves, as alternatively referred to hereafter. The abwaves impart a reaction propulsive momentum to the Pulsed Locomotor 1020 and the craft C to which it is attached. The direction of water ejection is shown by the bottom arrow; the craft's direction of travel is opposite that of water ejection, as shown by the top arrow. The heaving, up and down movement of the Pulsed Locomotor 1020 also creates forward moving waves of ambient fluids or adwaves, as alternatively referred to hereafter. As indicated in dots and by three inclined arrows to the left of the craft C, the adwaves move in the same direction as the craft C. The adwaves carry the craft in the direction of travel; in essence this means that the craft may not have to confront the undisturbed fluids ahead of the craft as is conventional with current propulsion systems. The adwaves add to the thrust from the abwaves.

Thus, the Pulsed Locomotor 1020 may propel crafts by abwaves from thrusting and also carry crafts by adwaves from reciprocation. Upon reaching take off speed the waircraft lifts off the water to fly in the air, as illustrated in phantom lines. The Pulsed Locomotor 1020 remains submerged or partially submerged. During operation the apparatus also works as an energy harvester, like propellers do, by converting the energy in fluid flow into mechanical work. The waircraft can be designed to fly above rough seas by control of altitude afforded by the variable length of the immersed portion of the driveshaft 1022. Reduction of drag, by flying Wing-in-ground, results in improved fuel economy and speed of travel. The crafts of FIGS. 9 and 10 could have some autonomy in full airborne flight when sufficient speed is reached to leave water and allow momentary flight by inertia of movement.

Figure 11:
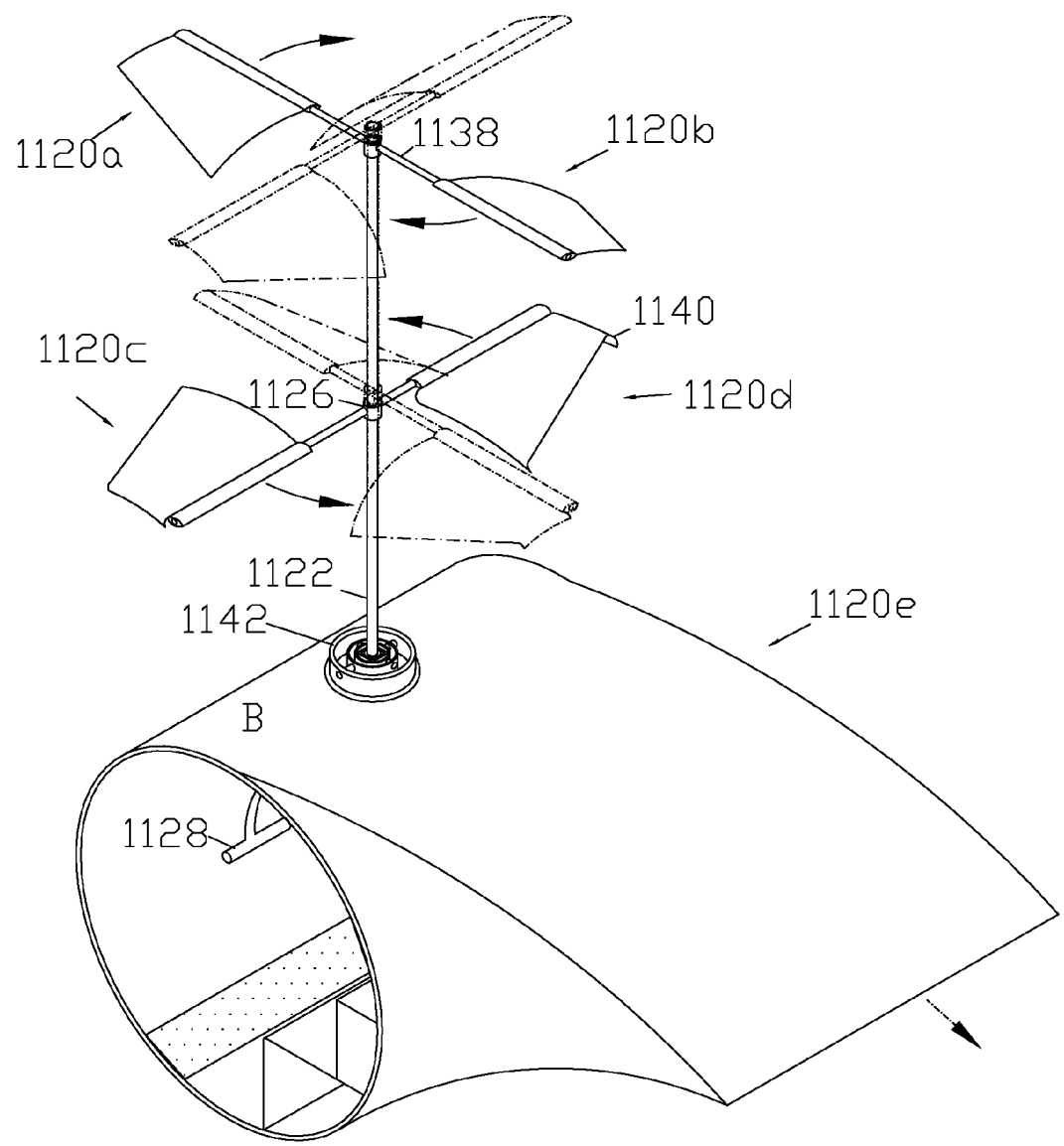
FIG. 11 is a perspective view of an embodiment of a Vertical Take Off and Landing (VTOL) craft powered by the Pulsed Locomotor.

FIG. 11 illustrates application of the Pulsed Locomotor in a Vertical Take Off and Landing Craft (VTOL). A helicopter-like craft may be constructed by securing on a base B, an attitude or steering control device, here exemplified by a gimbal mechanism 1142. The gimbal mechanism 1142 is coupled to a motor and guide on a plate, as previously disclosed for FIG. 7. A steering handle 1128 controls the attitude of the gimbal mechanism. The head 1138 is moveably secured to the driveshaft 1122 through bearing 1126. The driveshaft 1122 is slideably secured to the driveshaft guide (744) and securely coupled to motor M, for reciprocating animation. At least one blade or preferably a pair of opposed blades is carried on the head 1138 to provide Pulsed Locomotor 1120*a* to 1120*d*. The blade may advantageously be cambered for maximum lift and fitted with a side edge fence or flow director 1140. The base B is advantageously shaped to serve as the head of Pulsed Locomotor 1120*e*, for reciprocation by reactive momentum to reciprocation of the driveshaft 1122 by motor M (shown in FIG. 7). Pulsed Locomotor 1120*e* also serves as the cabin and as a lifting body during flight. Fuel for the motor M may be stored in a container behind a seat in front of which is a foot rest surface, shown in dotted area. Upon reciprocation of the driveshaft 1122, Pulsed Locomotors 1120*a*, 1120*b* propel ambient fluids to force the head 1138 to rotate about the bearing 1126, along rotation path indicated by the two top curved arrows.

This induced revolution enhances and adds to the thrust produced by reciprocation. At the effective reciprocation rate the craft lifts up to fly like a helicopter. A second pair of Pulsed Locomotors 1120*c*, 1120*d* may be installed in a similar manner, advantageously in counter-rotating mode, as indicated by the rotation path shown by the two bottom curved arrows. The counter-rotating pairs of Pulsed Locomotors can be set at a fixed angle, 90 degrees for example, by relocating the bearings 1126 inside the driveshaft guide (744) and securing the heads 1138 directly to the driveshaft 1122: in this embodiment, the driveshaft 1122 rotates inside the guide during reciprocation. Flight control can be achieved by altering the attitude of the driveshaft 1122 and Pulsed Locomotors using the gimbal mechanism (742) through manipulation of the steering handle 1128. The craft ascends or descends depending on amount of lift generated and moves towards the direction of angling of the gimbal. Preferably the weight on the input handle side, of the lever centred on the fulcrum provided by the gimbal, is greater than the weight of the reciprocated Pulsed Locomotors, on the output side. Such an arrangement imposes an automatic plumb configuration to the propulsion system, due to gravity. A plumb configuration results in a stable hover, climb and descent, and maneuverability.

Leisure crafts, man-powered crafts and swimming assistance devices.

The Pulsed Locomotor can be reciprocated manually. The task of reciprocation can be eased by coupling the implement to a lever affixed to a base. Such arrangements for use of the Pulsed Locomotor would be obvious to one skilled in the art without detracting from the novelty of the present invention. Examples of such actuation systems are described in U.S. Pat. No. 2,979,018 to Birdsall (1961) and in U.S. Pat. No. 3,236,203 to Bramson (1966). The crafts herein disclosed could be supported entirely by the Pulsed Locomotors to provide a hydrofoil type watercraft; in that case Pulsed Locomotors become propulsive hydrofoils, adaptable with adjustable thrust angle akin to current hydrofoil angle adjustment systems. Alternatively, Pulsed Locomotors with some buoyancy would provide a surface skimming craft.

Since other modifications and changes varied to fit particular operating requirements and environments will be apparent to those skilled in the art, the invention is not considered limited to the example chosen for purposes of disclosure, and covers all changes and modifications which do not constitute departures from the scope of this invention.

Having thus described the invention, what is desired to be protected is presented in the subsequently appended claims.

LIST OF REFERENCE SIGNS

20 Pulsed Locomotor
22 driveshaft
24 blade
26 bearing
28 steering handle
30 aperture
32 lubricant inlet
34 lubricant outlet
36 lubricant conduit
38 head
40 side edge fence
42 gimbal mechanism
44 driveshaft guide
46 gimbal plate
48 gimbal linkage
50 wheel

The invention claimed is:

1. An apparatus, for propelling ambient media, crafts and harnessing fluid power, comprising:
at least one blade, having a surface, a leading end with a leading edge, and a trailing end with a trailing edge, and
at least one drive shaft, rigidly secured to the leading end of the at least one blade at a fixed angle whereby, upon translating reciprocation substantially normal to the surface of the at least one blade, by a motive power source, the ambient media are forced towards the trailing edge thereby causing a reactive locomotion whereby the apparatus is cyclically urged forward during strokes and cyclically relaxed between strokes, thereby planing along figure-8 and intermediate inclined reciprocation paths.

2. The apparatus of claim 1 wherein the leading end is a cylindrical head whereby the blade is reinforced and the ambient media are accelerated.

3. The apparatus of claim 1 wherein the blade is folded into a V-shape whereby a leading end and twin arms with trailing edges are provided thereby creating a velocity dependent variable wing.

4. The apparatus of claim 1 wherein at least one side edge fence directs the ambient media towards the trailing edges.

5. The apparatus of claim 1 further comprising lubricant cavity provision means, fluidly connected to the at least one drive shaft, whereby a lubricant cavity is coated over the apparatus thereby reducing drag in the ambient media.

6. The apparatus as recited in claim 1 wherein the ambient media forced towards the trailing edge are directed to the leading edge of another of the at least one blade, rigidly secured to the at least one driveshaft in a tandem arrangement, whereby a multistage propeller with enhanced feedback propulsion is provided.

7. The apparatus of claim 1 wherein the at least one blade has a maximum width of one time the span of said at least one blade.

8. The apparatus of claim 1 wherein the at least one blade has a width in the range of one to three times the stroke length of the motive power source.

9. The apparatus of claim 1 or 5 wherein surface configuration and mechanical vibration means are provided on any of the at least one blade and the at least one drive shaft whereby the formation of a reduced viscosity boundary layer is promoted thereby reducing drag of the apparatus in the ambient media.

10. A craft for transportation, fluid power harvesting in and about water, air, and generally fluid media comprising:
a base,
a first motive power source, securely attached to the base,
at least a first one of the apparatus of claim 1 or 5, cooperatively connected to the first motive power source, whereby upon reciprocation, ambient fluid media are accelerated and ejected thereby propelling the base and the ambient fluid media in opposite directions, and
steering means, securely connected to the base whereby movement of the craft is controlled.

11. The craft of claim 10, further comprising at least a second one of the apparatus, cooperatively connected to any one of the first motive power source and an optional second motive power source securely attached to the base, whereby ambient fluid media ejected from the at least a first one of the apparatus are fed to the intake of the at least a second one of the apparatus thereby providing enhanced feedback propulsion.

12. The craft of claim 10 or 11 wherein the base is also one of the apparatus, whereby the reaction momentum imparted to the base upon reciprocation actuates the base to accelerate and eject ambient fluid media, thereby propelling the base.

13. The craft as recited in claim 10 or 11 wherein the base is supported in the ambient fluid media by at least one of the apparatus through any of the forces of buoyancy and lift.

14. The craft as recited in claim 10 or 11 wherein upon reciprocation includes actuation by wave power from the ambient fluid media whereby the at least one of the apparatus is actuated.

15. The craft of claim 10 or 11 wherein upon reciprocation includes induced revolution of the at least one of the apparatus about a supporting bearing, said supporting bearing being rotatively coupling to any one of the first motive power source and the optional second motive power source, whereby lift is enhanced and vertical take off and landing are enabled.

16. The craft of claim 10 or 11 wherein, under partially submerged conditions, reciprocation of the at least one of the apparatus against land, or a solid medium, causes the apparatus to hop in discreet steps thereby enabling locomotion over land, or the solid medium.

17. The craft of claim 10 or 11 wherein steering means, securely connected to the base, include at least one gimbal type mechanism, rotatively secured to the base and moveably secured to the at least one of the apparatus, whereby the ambient fluid media accelerated and ejected are steered, thereby enabling attitude and steering control.

18. Method of creating and optimizing wing profiles, comprising the steps of:
folding a flexible blade into a V or similar shape to form a V-blade whereby a leading end and twin arms with trailing edges are provided,
rigidly securing a drive member to the leading end whereby a propeller apparatus is created, and
displacing ambient media over the V-blade by reciprocating translation substantially normal to the surface plane of the V-blade, whereby the twin arms with trailing edges are progressively drawn to each other as speed increases thereby creating a velocity adapted wing profile, whereby ambient media are forced towards the trailing edges thereby causing a reactive locomotion whereby the propeller apparatus is cyclically urged forward during strokes and cyclically relaxed between strokes, thereby planing along figure-8 and intermediate inclined reciprocation paths.

* * * * *